March 31, 1942.  E. BERL  2,277,840
CONTACT SYSTEM
Filed May 3, 1940  3 Sheets-Sheet 2
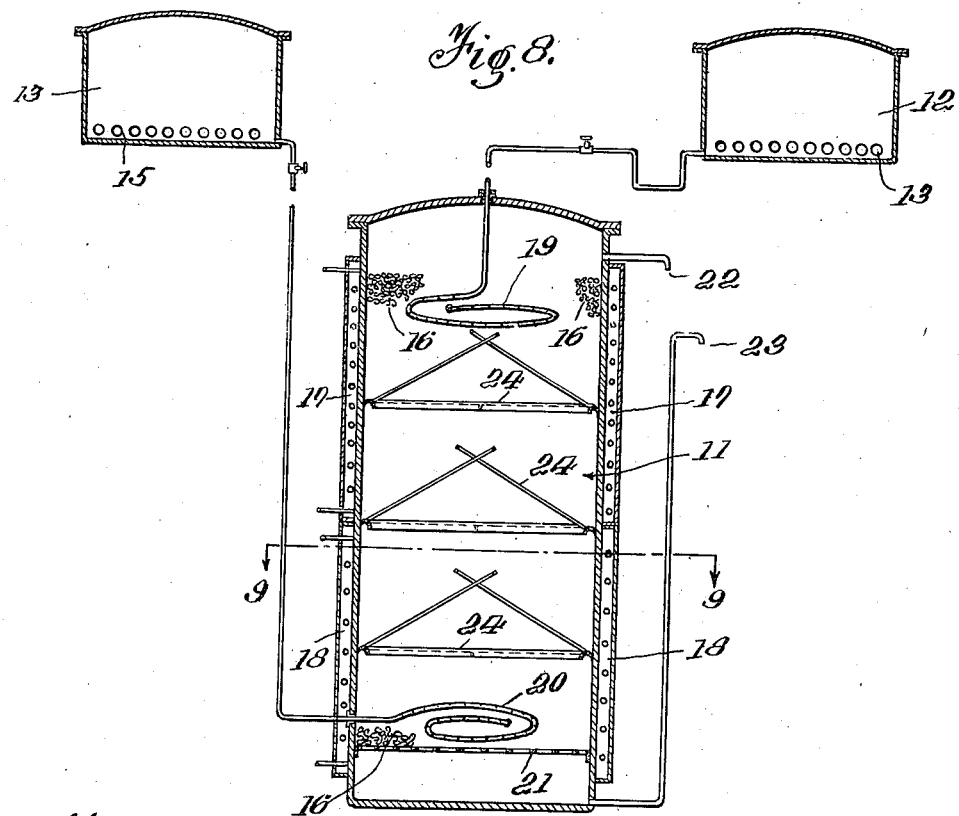
Fig. 8.
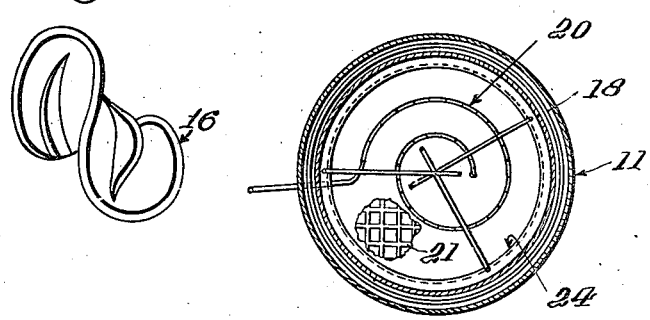
Fig. 10.
Fig. 9.
Ernst Berl,
INVENTOR.
BY Herbert Berl
ATTORNEY

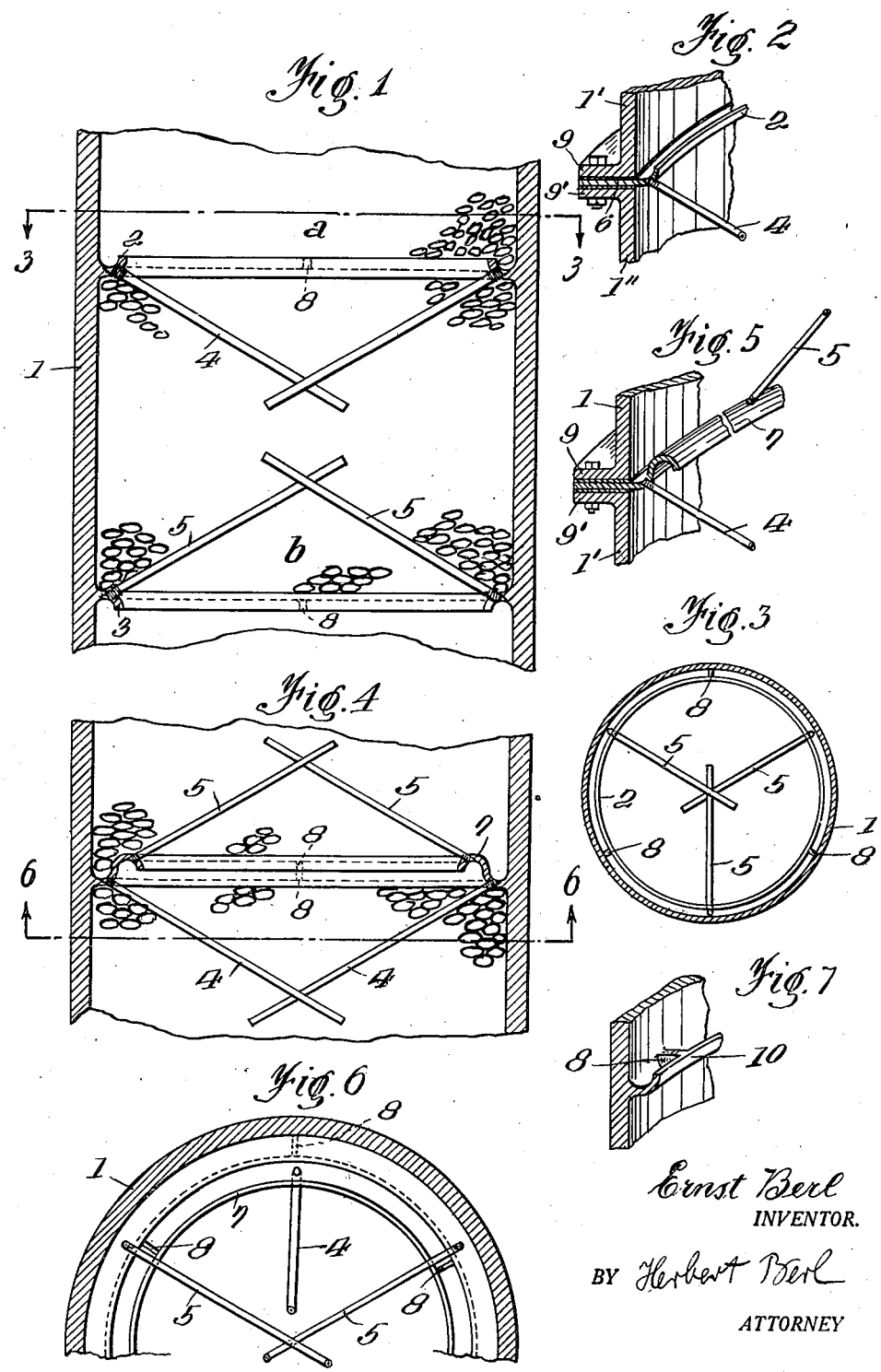

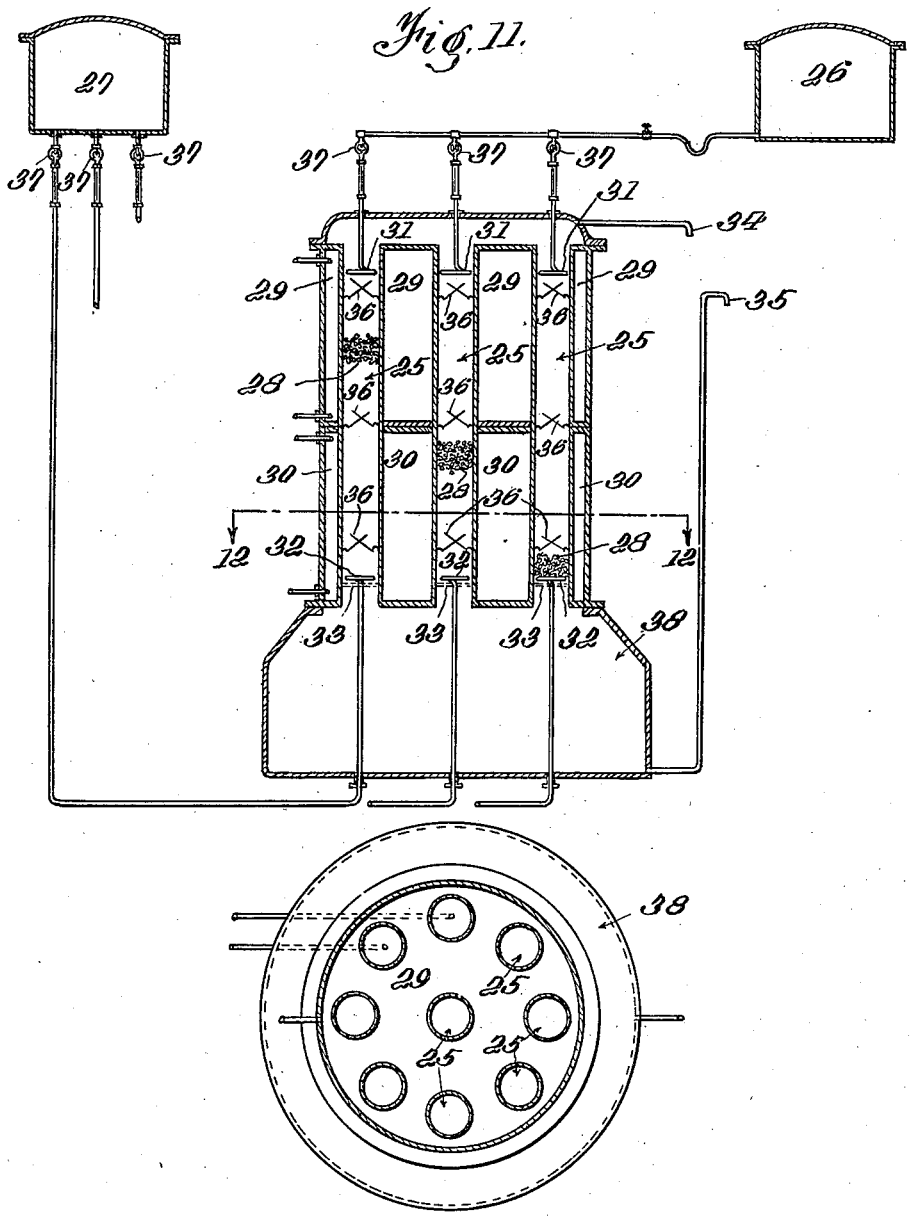

Patented Mar. 31, 1942

2,277,840

UNITED STATES PATENT OFFICE 2,277,840

CONTACT SYSTEM

Ernst Berl, Pittsburgh, Pa.

Application May 3, 1940, Serial No. 333,199

8 Claims. (Cl. 261—94)

In different apparatuses provided with filling materials, for instance rectifying columns, or in towers where a liquid phase has to be treated with a gaseous phase (chlorination or absorption of gases like carbon dioxide, or hydrogen sulfide, or solvent vapors), or for apparatus for treatment of one liquid phase with another liquid phase insoluble in the first (nitration, sulfonation, extraction, for example of oil fractions, etc.), the disadvantage exists that certain parts of the liquid or gaseous phase descending or ascending the walls of the packed columns or tower tend to travel down or up along the walls of the column (tower) and, therefore, do not come into the desired contact with the other phase. This is due to the fact that filling material has a tendency to drain liquids towards the wall where there are larger interspaces between the packing material and the material of the column (tower). This is the reason why such packed columns (towers), despite their great advantages, such as cheapness, low drop in pressure, good reciprocal action between gases (vapors) and liquids, have not received the recognition they deserve by the industry.

Efforts have been made to overcome this disadvantage by using bent conducting traps with openings at certain distances with the intention of returning the liquid running down the walls of the column to the interior. Devices of such a kind, however, do not yield the desired result. By their use the operative cross section of the tower is strongly reduced. Furthermore, considerable parts of the tower are not filled completely with the gas (vapor) streaming through, and the desired results are not obtained.

As a result of my investigations on this subject and in accordance with the present inventions, the disadvantages mentioned above are practically overcome by providing collecting annular spaces at suitable positions, for example arranged at about 2 to 8 times the diameter of the column from one another. These annular spaces are comparatively narrow so that they cannot be filled by the packing material, and should not influence the operative cross section of the tower.

Many operations like the nitration of aliphatic alcohols, like glycol or glycerine, and of aromatic hydrocarbons and phenols, like benzene, toluene, or carbolic acid, are mostly carried out actually in a discontinuous way. Rather large amounts of mixed acids are used in which the material to be nitrated is introduced whereby, through intensive stirring and strong cooling, the heat of reaction is removed. In spite of all precautions, accidents cannot be avoided which, in view of the rather large quantity of nitrated material, very often result in rather dangerous explosions. Another disadvantage of this operation is that the material to be nitrated in a not, or imperfectly, nitrated stage comes in contact with strong mixed acid, and, at the end of the nitration whereby a strong nitrating effect has to be produced, the material is in contact with weak acid because, through the formation of water and through the consumption of nitric acid, the mixed acid became weak. In those cases whereby the agitation is made by the introduction of compressed air, a rather large amount of nitric acid is entrained with this air and leads also to a weakening of the nitration power of the mixed acid.

It has been found that the process of nitration can be carried out in a continuous way with great advantage by using packed towers containing arrangements which have been described in this application. The arrangement can be seen from the drawing which gives only the principle of such a process. Lighter liquid enters at the bottom of the packed tower which contains filling material with rather large surface. It is advantageous to put filling material like saddles, according to U. S. Patent No. 1,796,501, of a comparatively small size at the bottom of the tower so that the size of the droplets of the liquid, like glycol, glycerine, benzene, toluene phenols, etc., may be kept very small and, therefore, the contact surface with the nitrating liquid, very high. The nitration material which may be composed of nitric acid, sulfuric acid, and, if necessary, of water or of nitric acid, phosphoric acid if necessary with a certain amount of $P_2O_5$, or water, or any other nitrating material, enters at the top. The specific weight of these mixed acids before and after complete nitration is generally higher than the specific weight of the materials to be nitrated and completely nitrated so that there is a counter flow whereby the heavier mixed acid flows from the top to the bottom and the the materials to be nitrated from the bottom to the top. If necessary, one can also use, instead of this countercurrent flow, the parallel flow of the materials from the top to the bottom, or from the bottom to the top. Using the right size of packed tower, the right size and nature of filling material, and the right relationship between the streaming liquids—organic alcohols, hydrocarbons, phenols, etc. and mostly inorganic nitrating acids or mixtures of nitric acid and glacial acetic acid—one can very easily regulate the nitration in such a way that on the top the nitrated material leaves the packed tower, and at the bottom the spent acid leaves the packed tower also. Very often it may be of some advantage to add to the packed tower a reservoir-like space whereby after nitration, by the conversion of mono- or di-glycerine nitrate into glycerine trinitrate, the nitration may be completed. Emulsified nitrates or nitro products, like glycerine trinitrate, trinitroluene, find the possibility to unite and to rise in the packed tower.

It may be advantageous to combine several columns which may be round or quadrangular, or may have any other geometric form, so that in the intermediate spaces cooling liquids, or warm liquids, or steam may be introduced.

Such an arrangement shows great advantages. In the preferred counter-current flow the partly or nearly completely nitrated material comes in contact with the strong mixed acid and the non-nitrated material with a weaker acid containing less nitric acid and more water. Therefore, the whole nitration process can be carried out with much more success than in the case of discontinuous processes. The great advantage is that one can use mixed acids which contain less nitric acid and which, in spite of their cheaper price, give the same final nitration effect. The separation of nitrated material from the nitrating acid can be carried out in an excellent way so that the nitric acid ester or nitro product contains much less acid than in the so-called "classical" discontinuous process. On the other hand, the spent acid is practically free from organic compounds and can be reinforced and used for further nitration purposes.

Another very important advantage of this process is that the danger of explosion is practically nil. The amount of nitric acid ester or nitro product in the packed tower during the continuous operation is relatively small. Furthermore, the material is in contact with an appropriate amount of mixed acid so that practically no danger of explosion exists. In case of an undue rise in temperature the addition of material to be nitrated can be stopped and fresh, mixed acid, which in any of these cases may be used in a cooled state, can be added so that any danger of a quicker reaction can be avoided.

It is therefore an object of this invention to provide an arrangement whereby the ascending and descending liquids can be deflected from the wall of the tower towards its middle; and It is a further object of the invention to provide an arrangement adapted to carry out the above-mentioned object, while at the same time being economical to make and easy to install.

It is another object of the present invention to provide a continuous nitration, sulfonation or other contact process for liquid or gaseous substances.

It is another object of the present invention to provide a nitration, sulfonation or other contact process substantially eliminating the danger of explosions inherent in conventional processes.

Still another object is a higher degree of nitration or sulfonation than can be obtained by the conventional discontinuous nitration processes.

A further advantage of the present invention is the absence of moving parts in the apparatus for carrying out the process which lengthens the life of the apparatus and further decreases the danger of an explosion.

And a further object of the invention is to provide an improved contact apparatus for the contact of liquids with liquids, liquids with gases, and gases with gases.

Other objects of the invention will readily become apparent from the specification and drawings.

In the accompanying drawings,

Fig. 1 shows a longitudinal section through a redistribution arrangement in accordance with the invention;

Fig. 2 shows a perspective partial view of a tower provided with the redistribution means according to the invention;

Fig. 3 is a cross-section taken along the line 3—3 of Fig. 1;

Fig. 4 is a view in longitudinal section through a modified redistribution system;

Fig. 5 shows in a perspective partial view a tower provided with modified redistribution means according to Fig. 4;

Fig. 6 is a cross-section taken along lines 6—6 of Fig. 4;

Fig. 7 shows a partial perspective view of a tower wall integrally provided with redistribution means according to the invention;

Fig. 8 is a view in longitudinal section through a nitration or sulfonation plant employing redistribution means according to the invention;

Fig. 9 is a cross-section through Fig. 8 along the lines 9—9;

Fig. 10 shows a perspective view of filling material preferably used in processes according to the invention;

Fig. 11 shows in longitudinal section a modified nitration or sulfonation plant according to the invention; and Fig. 12 shows a cross-section through Fig. 11 along the line 12—12.

More particularly: On the inside of the wall of packed tower 1 there is a plurality of redistribution arrangements $a$ and $b$, each consisting of an open conduit following the inner periphery of the tower wall. The conduits either are open towards the top of the tower 2 or towards its bottom 3. From the conduits 2 and 3 are extended additional conduit obliquely towards or beyond the middle of the tower; from the conduit opening towards the top 2 the additional conduits point downwardly 4, from the conduit opening towards the bottom 3 they point upwardly 5. This arrangement assured that liquids or gases descending along the wall of the tower are caught by conduit 2 and dispatched towards the middle of the tower by conduits 4, while ascending gases or liquids are similarly conveyed by conduits 3 and 5. It is advantageous to divide the main conduits 2 and 4 into partitions by means of stops 8 corresponding in number to the additional conduits 3 and 5, in order to avoid overburdening one particular additional conduit, should the main conduit not be precisely level.

A preferred way of fastening the redistribution system to the tower is shown in Fig. 2. The conduit 2 is extended outwardly so as to form a flat annulus, which is bolted between the flanges 9, 9' of the section 1', 1" of the tower. The closed side of the conduit should form an angle of at least 90° with the wall in order to avoid accumulations of liquids or gases between wall and conduit.

A modification is shown in Fig. 4. In that modification the main conduit 7 is double and consists of a conduit opening towards the top and integrally therewith a concentric conduit opening towards the bottom. The additional conduits 4, 5 extend towards or beyond the middle of the tower from the main conduit as above described.

The tower wall may be integral with the conduit 10 as shown in Fig. 7.

The additional conduits 4, 5 may be pipes open at both ends, or open conduits opening in the same direction as the main conduit from which they extend.

A complete nitration (or sulfonation) plant utilizing the present invention is shown in Figs. 8 to 10. With packed tower 11 there is connected the container containing the acid mixture 12 and the container containing the material to be treated 13. According to the requirements of the process used, heating and cooling coils 14 and 15 are provided. The tower is filled with filling material 16, preferably with material shaped like a saddle, as shown in Fig. 10, in accordance with my U. S. Patent No. 1,796,501. The tower 11 is advantageously lined with cooling and heating jackets 17, 18 for the proper regulation of the process. The substance introduced at the top of the tower 11 may be introduced by means of perforated coil 19, and the substance introduced at the bottom by means of perforated coil 20. At the bottom of tower 11 there is the grate 21 on which the filling material 16 is piled up. The treated material is discharged through outlet 22, and the spent acid through outlet 23. The inside of the tower 11 is provided with a plurality of redistribution systems 24 which are illustrated in greater detail in Figs. 1 to 7.

The nitration (or sulfonation) plant illustrated in Figs. 11 and 12 resembles the preceding plant, except that it contains a plurality of packed towers 25. A tank containing the acid mixture 26 and a tank containing the material to be treated 27 are connected with the towers 25 for simultaneous treatment. The towers 25 are packed with packing material 28, preferably saddle shaped material in accordance with my U. S. Patent No. 1,796,501. In the illustrated plant, the towers 25 are concentrically arranged inside a single cooling jacket 29 and a single heating jacket 30; it is to be understood, however, that each tower may be fitted with an individual heating and cooling jacket. The material fed to the top of the towers may be let in by means of the perforated coils 31, and the material introduced at the bottom may be let in through perforated coils 32. The filling material 28 in each tower 25 rests on a grate 33. The treated material is discharged from the plant through outlet 34, and the spent acid is discharged through outlet 35. Redistribution systems 36 are arranged within the towers 25 in accordance with the present invention, thus securing a complete and safe carrying out of the process. Measuring capillaries 37 are connected in appropriate locations with tanks 26 and 27 and with the pipes leading therefrom to towers 25. A separator 38 may be provided at the bottom of the plant below towers 25 for collecting and discharging the heavier of the two materials after completion of the process.

Having now fully described my invention, I believe that modifications thereof, all within the scope of my invention, will readily become apparent to those skilled in the art. The scope of the invention therefore is limited by the appended claims only.

I claim:

1. A redistribution arrangement for liquids or gases flowing in substantially vertical countercurrent in a packed tower, comprising a circumferentially arranged conduit, which is open towards the bottom of said tower, mounted on the inside of said tower intermediate the bottom and the top of said tower and adjacent the inner periphery of said tower, and conduits obliquely extending upwardly from said first-mentioned conduit towards the middle of said tower.

2. A redistribution arrangement for liquids or gases flowing in substantially vertical countercurrent in a packed tower, comprising a circumferentially arranged double conduit, one part of said conduit being open towards the top of said tower and the other part of said conduit being open towards the bottom of said tower, said double conduit being mounted on the inside of said tower intermediate the bottom and the top of said tower and adjacent the inner periphery of said tower, conduits obliquely extending downwardly towards the middle of said tower from said first-mentioned part which is open towards the top of said tower, and conduits obliquely extending upwardly towards the middle of said tower from said second-mentioned part, which is open towards the bottom of said tower.

3. An open conduit according to claim 1, the upper side of which forms an angle of at least 90° with the inside of the wall of said tower.

4. A redistribution arrangement according to claim 1, wherein there is a plurality of said open conduits arranged within said tower.

5. A redistribution arrangement according to claim 1, wherein said first named conduit is divided into a plurality of sections by a plurality of stops.

6. A redistribution arrangement according to claim 1, wherein said first named conduit is divided into a plurality of sections by a plurality of stops, the number of said sections and stops being equal to the number of said last named conduits.

7. A redistribution arrangement according to claim 2, wherein said double conduit is divided into sections by a plurality of partitions.

8. A redistribution arrangement according to claim 2, wherein there is a plurality of said double conduits arranged within said tower.

ERNST BERL.